REAGENT CONTROL BY POTASSIUM CONTENT OF ORE

INVENTORS
JESSE F. HENDERSON
FRED L. SMITH
JOHN K. PERRY
BY

ATTORNEYS

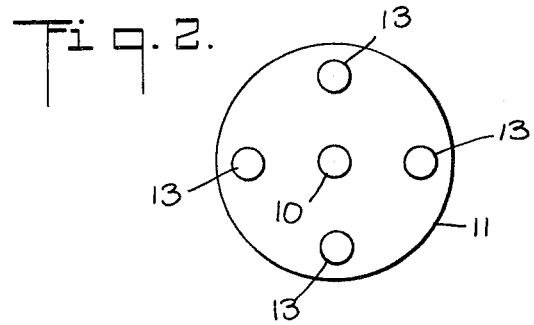
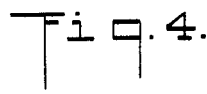
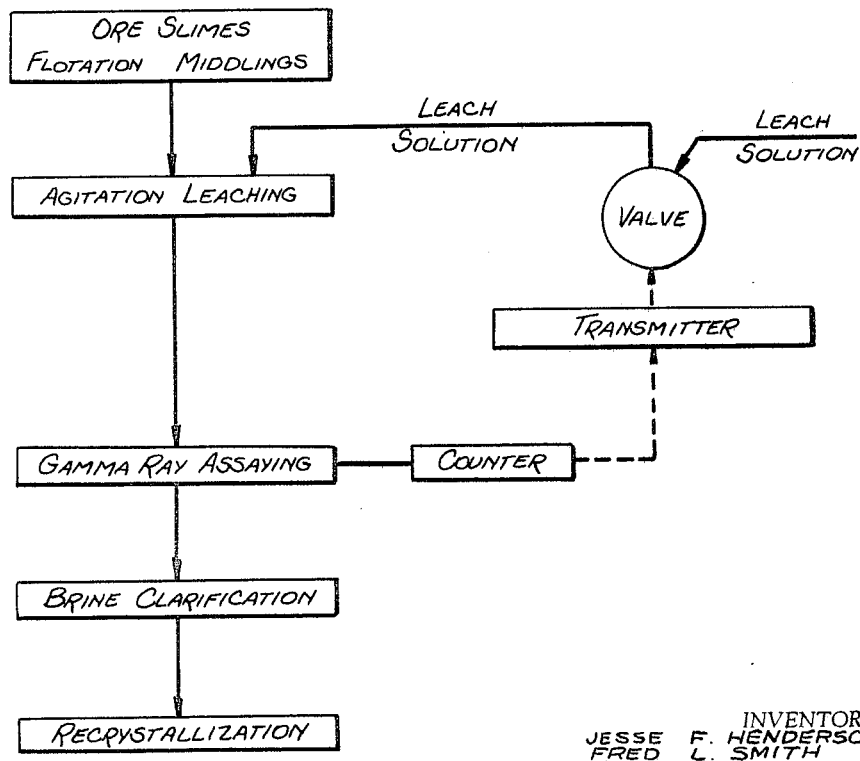

United States Patent Office 3,332,744
Patented July 25, 1967

---

3,332,744
RADIOMETRIC METHOD FOR PLANT STREAM CONTROL IN POTASH AND PHOSPHATE RECOVERY PROCESSES
Jesse F. Henderson, Moab, Utah, and Fred L. Smith, Wheatridge, and John K. Perry, Golden, Colo., assignors to Texas Gulf Sulphur Company, New York, N.Y., a corporation of Texas
Filed Sept. 3, 1963, Ser. No. 306,197
3 Claims. (Cl. 23—230)

This invention relates to a radiometric assay method and apparatus and more particularly to a method of determining the concentration of a particular constituent in a plant stream or composition of matter by determining the concentration or amount of one or more radioactive gamma emitting isotopes of said constituent with which it bears a fixed relation.

For example, in determining the potassium values in potash ores or mill samples heretofore the standard chemical method, i.e. chloroplatinate assay, has been used. Such a chemical method is both costly and time consuming, requiring up to two hours to make one determination. Consequently, the chemical method is unsuited for plant stream control. Faster methods, somewhat sacrificing accuracy, must be used. It is desirable and important to have a means of determining potassium content of ore and mill samples in a more economical and expeditious manner than that provided by standard chemical techniques and more accurately than the prior known faster alternatives to chemical analysis.

It is an object of the present invention to provide a radiometric assay method by which potassium values can be accurately determined in a matter of a few minutes and to provide better accuracy than is possible with conventional chloroplatinate assays especially at low potassium concentrations. This method will also apply to any material having a radioactive component, such as certain phosphate minerals which contain residual uranium daughter traces.

It is another object of the invention to use the aforesaid radiometric method to provide automation of unit mill operations.

Briefly, the present invention is based on the fact that, for example, a natural potash ore contains in fixed isotopic abundance, radioactive gamma emitting isotope potassium 40. The amount of the isotope contained in a particular ore body is constant since the half-life of potassium 40 is of the order of $1.3 \times 10^9$ years. In practicing the method in controlling a plant stream, the potassium value in the plant stream is determined by making an actual determination of the amount of the radioactive isotope $K^{40}$ present by measuring the gamma radiation density thereof by taking a grab sample or by making the determination directly on the stream itself. Since the ratio of the isotope to the total potassium value is known or can be ascertained and is a constant value for a given ore deposit, the total potassium value is determined by a simple correlation.

Apparatus utilizing the method comprises in one embodiment a liquid scintillator tank containing fluid adapted to produce scintillations in response to gamma radiation from the isotope. A conduit conveying the plant stream extends through the tank and a plurality of photomultiplier tubes sensitive to the scintillations are disposed at spaced peripheral positions around the tank at one end thereof and communicate with the interior of the tank to pick up the scintillations from the fluid. An amplifier is coupled with the photomultiplier tubes and a counter is coupled with the amplifier output to count the amplified signals to produce an indication corresponding to the gamma radiation density in the plant stream. A control interconnects the counter with, for example, a variable speed feed pump in the plant stream for adjusting the rate of the pump for a preselected count on said counter, whereby the flow rate of the plant stream is controlled to provide a certain delivery rate or amount of total potassium.

Similarly, the counter could control a variable speed reagent feeder whereby the proper amount of flotation reagent could be supplied as required by the potassium content of the flotation feed stream.

Other objects and features of the invention will be found in the following description and claims and in the drawings in which—

FIG. 2 is an elevation of the scintillator tank showing the disposition of the photomultiplier tubes;

FIG. 4 is a block diagram of a system for automating control of leaching of ore slimes in flotation middlings.

Figure 1:
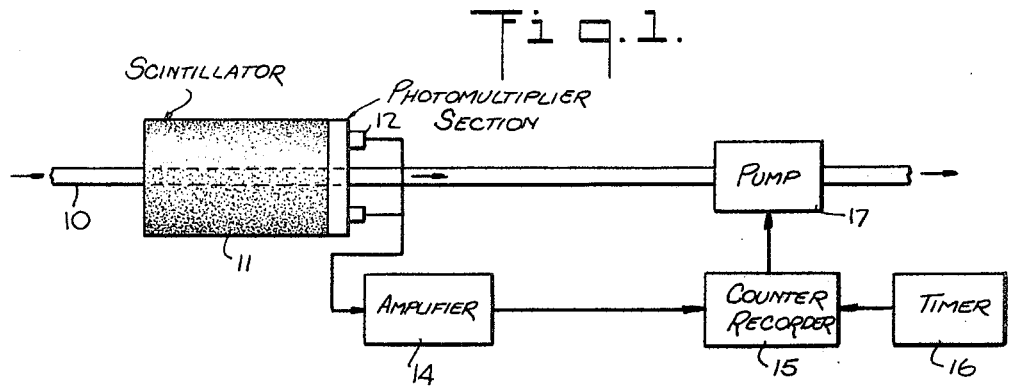
FIG. 1 is a block diagram of apparatus used for automation of a plant stream in accordance with the present invention.

Referring now to the drawings, FIG. 1 shows one arrangement of practicing the method of the present invention in conjunction with an automatic system of controlling a plant stream, for example in a potash plant where the desired constituent in the plant stream is potassium. The conduit or pipe 10, containing the plant stream which is indicated by the arrows in FIG. 1, passes axially through the cylindrical scintillator or detector tank 11 which is filled with scintillator fluid and has at one end a photomultiplier section 12 consisting of four photomultiplier tubes 13 disposed at spaced positions around said conduit and having viewing access into said tank 11 through correspondingly spaced ports or windows (not shown) in tank 11. The output of the photomultiplier tubes is fed through an amplifier 14 to a counter-recorder mechanism 15 which is controlled by timer 16 and is interconnected with the variable speed pump 17.

The gamma radiation from the radioactive isotope $K^{40}$ in the plant stream causes corresponding scintillations in the scintillation fluid which are picked up by the photomultiplier tubes to provide electrical signals which are then amplified by the amplifier and counted and recorded by the counter-recorder circuit. By determining the count for a predetermined period of time as set on timer 16, an indication of the total potassium concentration in the plant stream is obtained which is then used to control the rate of pump 17 to maintain a predetermined potassium concentration or feed rate.

In one specific embodiment the detector consisted of a cylindrical tank 16 inches in diameter and 8 inches along the axis. Four 5 inch diameter photomultiplier tubes were used. The sample chamber was a longitudinal cylindrical hole about 4.5 inches in diameter running axially through the detector. The tank contained approximately 22 liters of liquid scintillator containing 4 grams per liter of scinillation grade 2,5 diphenyloxazole and 0.1 gram per liter of 1,4-di-[2(5-phenyloxazole)]-benzene, dissolved in reagent grade toluene. The tank was constructed of steel and its interior was electroplated with a thin coating of copper and a white reflective coating was applied which was compatible with the scintillator fluid.

The viewing ports or windows were constructed of a polymeric carbonate having a refractive index of 1.504 which is substantially the same as that of the scintillator fluid. Although no optical coupling was used between the photomultiplier tubes and the window, if used it would increase the pulse height from the photomultiplier tubes.

The photomultiplier assembly was attached to the tank in light-tight condition.

The gain of the four photomultiplier tubes was balanced by varying the high voltage applied to each tube by means of a 2 megohm potentiometer (not shown) placed in series with the bleeder chain of each tube. After balancing the photomultiplier tubes, a plateau curve (counts per minute v. voltage) was run, and the optimum operating voltage was found to be 1450 volts delivered from the high voltage supply (not shown).

For the radiometric analyses a transistorized amplifier and single channel analyzer with manual base line voltage advance was used. A Baird-Atomic Model 134 high speed scaler or counter requiring negative pulses of at least 5 volts for triggering was also used. Measurement showed that the output pulses from the detector were only 1.5 volts negative, so a Hewlett-Packard Model 450–A amplifier was placed between the Johnston analyzer and the Baird-Atomic scaler and set at 20 db gain ($10\times$) to obtain pulses capable of triggering the scaler. A Baird-Atomic Model 930 electronic timer was used with the scaler.

With about 908 grams (two pounds) or reagent grade potassium chloride (as a source of 1.46 mev. gamma rays from $K^{40}$) in the detector sample chamber, there was no attenuation of input signal to the transistorized amplifier (attenuation factor of X1), and an analyzer differential window width (channel width) of 5.0 volts, the optimum signal to noise ratio (i.e., sample to background ratio) was found to be 6.41 at a base line setting of 40.0. Under these conditions a net count rate of approximately 10,500 c.p.m. was obtained from the $K^{40}$ contained in the potassium chloride.

Previous tests with the Baird-Atomic automatic single channel analyzer had shown that the resolution of the liquid scintillator was such that no photopeak from the $K^{40}$ 1.46 mev. gamma ray was obtained and all pulses fell within the Compton scattering region. However, a rather narrow channel width of 2.5 volts did yield a somewhat higher signal to noise ratio (7.45), but with considerably lower net count rate. Larger channel widths (up to 10.0 volts) gave higher net count rates but lower signal to noise ratios (3.75 at 10.0 volts). The analyzer settings of 5.0 volt channel width and base line setting of 40.0 were selected for further operation because they yielded the highest signal to noise ratio still retaining a satisfactory count rate.

The resolving time (or "dead" time) of the Baird-Atomic scaler is less than one microsecond; it had previously been determined experimentally to be about 0.13 microsecond for the scaler in use with this system. The resolving time for this entire system (i.e., with the transistorized amplifier and single channel analyzer) was determined by the two-source method to be 60.6 microseconds or $1.01\times 10^{-6}$ min. (analyzers have relatively long resolving times, because they involve coincidence and anticoincidence circuits). Actually, this resolving time does not add any serious error (less than one percent of error even for the amount of $K^{40}$ in pure KCl) at the count rates involved. Consequently, corrections for "dead" time were not made during this study. Actually as a check "dead" time corrections were made for two materials relatively high in percentage of $K_2O$, and corrected tolerance limits were calculated for comparison and there was virtually no difference.

In order to obtain a valid comparison of the radiometric and chloroplatinate assays, they had to be compared to a set of figures known to be true, or absolute values. Consequently, five standards were carefully prepared from reagent grade potassium chloride and sodium chloride. There was calculated to be a possible maximum of 0.02 percent error in calculated $K_2O$ contents if none of the possible weighing errors were compensating; actually, at least some weighing errors should be compensating, thus reducing errors from this source below the calculated maximum. The standards were then blended, pulverized to minus 325-mesh, run through the pulverizer twice more for additional blending, and finally blended manually on a rubber sheet. These five standards were numbered A through E.

In addition, equal quantities of the above standards were blended to yield four additional standards numbered A' through D'. Only 50 grams of each of these additional standards were prepared, and they were used for additional information on chloroplatinate assays only.

Calculated weight percentages of $K_2O$ in the standards are shown in Table 1. These figures are considered to be absolute values, and are used for subsequent statistical comparison of radiometric and chloroplatinate assays.

TABLE 1.—CALCULATED ABSOLUTE WEIGHT PERCENT POTASSIUM IN STANDARDS AS $K_2O$

| Standard number: | Weight percent $K_2O$ |
|---|---|
| A | 1.022 |
| A' | 5.522 |
| B | 10.021 |
| B' | 17.475 |
| C | 24.928 |
| C' | 32.419 |
| D | 39.910 |
| D' | 47.357 |
| E | 54.804 |

Twenty-six duplicate chloroplatinate assays on unknown samples were found to have a product moment of 0.9995, indicating excellent correlation. However, no estimate of tolerance limits for an individual determination could be made, because neither set of data was absolute. Therefore, the prepared standards described above were used to obtain data for statistical analysis.

Portions of the standards were submitted for potassium assays by the chloroplatinate method. Results are tabulated in Table 2.

TABLE 2.—CHLOROPLATINATE ASSAYS ON STANDARDS

| Calculated Absolute Percent $K_2O$ | Percent $K_2O$ by Chloroplatinate Assay | Calculated Absolute Percent $K_2O$ | Percent $K_2O$ by Chloroplatinate Assay |
|---|---|---|---|
| 1.022 | 1.53 | 24.928 | 25.1 |
| 1.022 | 1.14 | 24.928 | 24.9 |
| 1.022 | 1.14 | 32.419 | 32.6 |
| 5.522 | 5.78 | 32.419 | 32.6 |
| 5.522 | 5.78 | 39.910 | 39.72 |
| 10.021 | 10.06 | 39.910 | 40.04 |
| 10.021 | 10.05 | 39.910 | 40.1 |
| 10.021 | 10.00 | 39.910 | 40.1 |
| 10.021 | 10.00 | 47.357 | 47.3 |
| 17.475 | 17.8 | 47.357 | 47.5 |
| 17.475 | 17.9 | 54.804 | 55.06 |
| 17.475 | 17.2 | 54.804 | 55.04 |
| 17.475 | 17.3 | 54.804 | 55.1 |
| 24.928 | 25.04 | 54.804 | 55.1 |
| 24.928 | 25.07 | | |

All determinations were made with optimum settings of the large volume counter, i.e., high voltage power supply set at 1450 volts; amplifier gain maximum (attenuating setting of X1); analyzer base line or threshold set at 40.0; window or channel width set at 5.00; Hewlett-Packard supplementary amplifier set at 20 db gain.

Six hundred seventy (670) grams of each of the five potash standards (A, B, C, D and E) were placed in polyethylene bags, sealed, and placed in cylindrical one-quart cardboard freezer cartons to provide consistent geometry. A dummy sample was prepared in the same manner from reagent grade sodium chloride for background determination.

Each standard (and background) was counted to a preset 10,000 gross counts with 10 repeats. These data were used to calculate a regression equation by the least-squares method (i.e., calibration) to solve for percent $K_2O$:

TABLE 3.—RADIOMETRIC ASSAYS FOR PERCENT $K_2O$ IN STANDARDS, CALCULATED BY USE OF THE REGRESSION EQUATION [1]

| Standard | | | | |
|---|---|---|---|---|
| A | B | C | D | E |
| 1.022 (Percent $K_2O$) | 10.021 (Percent $K_2O$) | 24.928 (Percent $K_2O$) | 39.910 (Percent $K_2O$) | 54.804 (Percent $K_2O$) |
| 1.15 | 9.85 | 25.11 | 39.44 | 55.61 |
| 0.87 | 9.92 | 25.49 | 39.44 | 55.61 |
| 0.98 | 9.92 | 25.11 | 40.97 | 53.12 |
| 1.02 | 10.05 | 25.49 | 39.44 | 54.97 |
| 1.04 | 9.79 | 25.55 | 40.20 | 54.97 |
| 0.85 | 9.79 | 24.92 | 40.97 | 54.34 |
| 0.87 | 9.92 | 24.55 | 39.44 | 55.61 |
| 1.04 | 9.85 | 24.73 | 40.58 | 54.97 |
| 1.23 | 9.79 | 25.11 | 40.20 | 54.97 |
| 1.00 | 9.98 | 24.92 | 39.44 | 53.72 |
| 1.00 | 9.85 | 24.99 (Average) | 40.01 | 54.78 |

[1] Percent $K_2O = -0.227 + 0.00686$ (Net c.p.m.).

The radiometric assays calculated by use of the regression equation are compared with chloroplatinate assays in Table 4:

TABLE 4.—RADIOMETRIC ASSAYS OF FOUR FLOTATION PRODUCTS FROM CANE CREEK CORES

| Sample Number | Net c.p.m. | Radiometric, percent $K_2O$ | Chloroplatinate, percent $K_2O$ |
|---|---|---|---|
| D-5 | 457 | 2.91 | 3.22 |
| D-11 | 1,094 | 7.28 | 7.93 |
| D-12 | 653 | 4.25 | 4.73 |
| D-13 | 8,217 | 56.51 | 58.6 |

It should be noted that the regression equation shown previously is valid for computation only so long as the weight of the unknown is identical with the weight of the standards used for calibration (i.e., 670 grams in this case). It would be desirable to be able to place any weight sample (up to the limit of capacity of the sample chamber) in the counter and calculate percent $K_2O$ from the results. With this end in mind we placed 100 grams, 200 grams, 300 grams, ... 900 grams of reagent grade potassium chloride in the counter and obtained the results shown in Table 5:

TABLE 5.—COUNTING DATA ON DIFFERENT WEIGHT SAMPLES

| Wt. (g.) pure KCl: | Net c.p.m. |
|---|---|
| 100 | 1,558.8 |
| 200 | 2,962.4 |
| 300 | 4,296.4 |
| 400 | 5,599.8 |
| 500 | 6,959.5 |
| 600 | 8,178.7 |
| 700 | 9,430.6 |
| 800 | 10,621.9 |
| 900 | 11,704.2 |

Naturally, it is impossible to obtain constant geometry with different weight samples of identical material. However, if the photomultiplier tubes are matched in gain, response should be symmetrical regardless of radial and circumferential source position. Of course, changes in longitudinal source position or axial length would cause drastic changes in response due to solid angle differences. Axial length was held constant by placing the samples in cylindrical freezer cartons which were, as with all samples, always positioned at the same axial distance from the photocathodes. The sample geometry can be quickly visualized by imagining a barrel laying on its side which is filled with successive increments of equal volumes of water.

The data given in Table 5 plots as a straight line on log-log paper (probably a self-adsorption effect), and should thus fit an equation of the form:

$$\text{Log } x = a + b \text{ log } y$$

We can now derive a general equation for determination of percent $K_2O$ in an unknown of any weight.

$$\text{Log } x = a + b \text{ log } y$$

where:

$x$ = sample weight (independent variable)
$y$ = net c.p.m. (dependent variable)
$a$ and $b$ are constants By the method of least squares and data in Table 6:

$$a = -1.46509$$
$$b = 1.08490$$

However, we wish to determine net c.p.m. so by manipulation:

$$\text{Log } y = \frac{-a}{b} + \frac{1}{b} \text{ log } x = A + B \text{ log } x$$

where $$A = \frac{-a}{b} = \frac{1.46509}{1.08490} = 1.35044$$

$$B\frac{1}{b} = \frac{1}{1.08490} = 0.92174$$

Definitions for the derivation which follows are:

$Z_{std}$ = weight of calibration standards = 670 grams
$Z_u$ = weight of unknown (grams)
$y_u$ = net c.p.m. from unknown of weight $Z_u$
$y_{std}$ = net c.p.m. from unknown if it were the same weight as the calibration standards
$x_u$ = percent $K_2O$ in unknown Now, regardless of the weight basis of the unknown, its percent $K_2O$ should be constant, i.e., $x_u = x_{std}$, in which case:

$$\frac{\text{Log } y_{std}}{\text{Log } y_u} = \frac{A + B \text{ log } Z_{std}}{A + B \text{ log } Z_u}$$

Thus, $$y_{std.} = \log^{-1}\left[\frac{(\log y_u)(A + B \log Z_{std.})}{(A + B \log Z_u)}\right]$$

Or, $$y_{std.} = \log^{-1}\left[\frac{(\log y_u)(1 + B/A \log Z_{std.})}{1 + B/A \log Z_u}\right]$$

where $B/A = 0.68255$

Now, the previously determined regression equation for samples of weight $Z_{std}$ (i.e., 670 grams) was $$x = a + by$$

where:

$x$ = percent $K_2O$
$y$ = net c.p.m.
$a = -0.227$
$b = 0.00686$

If we let $x = x_u$ = percent $K_2O$ in an unknown weight $Z_u$ and $y = y_{std}$, then:

$$x_u = a + b \log^{-1}\left[\frac{(\log y_u)(1 + B/A \log Z_{std.})}{1 + B/A \log Z_u}\right]$$

Or, substituting numerical values $$x_u = \text{percent } K_2O = -0.227 + 0.00686 \log^{-1}\left[\frac{(\log y_u)(1 + 0.68255 \log Z_{std.})}{1 + 0.67255 \log Z_u}\right]$$

The equation for $y_{std}$ does not completely linearize the data, but approximates it very closely (approximately one percent error in calculated values).

The above equation can thus now be used to calculate the percent $K_2O$ in a sample from counting data even if the sample weight is different from the weight of the standards used for calibration.

For example, a sample of potash ore from Carlsbad, N.M., had been used in the form of minus 8-mesh material and minus 325-mesh material to determine if there was any difference in count rate. We will now use the counting data obtained to illustrate the use of the above equation. The net c.p.m. obtained from the material was 5857 c.p.m. with 1200 grams in the counter. A chloroplatinate assay on the material showed 24.7 percent $K_2O$. Substituting the counting data in the above equation we obtain a radiometric assay of 24.55 percent $K_2O$. There is only 0.6 percent of error between this radiometric assay and the chloroplatinate assay.

By similar calculations it was determined that minimum sample weights usable in the large volume detector are as follows:

TABLE 6

| Material | Percent $K_2O$ | Calculated approx. minimum weight (g.) for large vol. counter |
| --- | --- | --- |
| Average tailings | 3.65 | 7.39 |
| Average ore | 27.2 | 28.47 |
| Average product | 61.3 | 37.36 |

In the actual use of such a system there would be another factor that would enter into calculation of percent $K_2O$ from radiometric data, and that is a correction for long-term drift. Such drift in response of the system would be due to drift in electronic components (say, with aging) and in the case of a liquid scintillator a probably even more important factor would be degradation of scintillator efficiency with age.

Such drift is easily corrected for. One of the original calibration standards is always retained in its original container (i.e., geometry) and is periodically counted, say once a week or perhaps even once a day. Radiometric percent $K_2O$ obtained by use of the previously shown equation is then easily corrected by multiplying by the ratio of original net c.p.m. for the standard at the time of calibration divided by the present net c.p.m. for the present standard.

Such determination of drift also would serve a diagnostic function; any sudden change in drift would indicate a component failure, as opposed to gradual drift caused by aging of components and liquid scintillator.

The detector should be calibrated each time it is set up in a different location because of changes in local background, different instrument settings, etc. Furthermore, the above calibration was for solid material. If determination on for example a brine slurry were desired a separate calibration would have to be made because of the different self-adsorption of the medium (brine vs. air, in this case). Furthermore separate calibration curves or equations would have to be made if there were changes in geometry. For instance, the calibration for static determination with the detector set up in a laboratory using a particular sample container would be different from that for the detector set up "on stream" with a pipe passing through it because of differences in solid angle relationship.

The techniques of the present invention have also been found useful in determining concentrations and controlling plant streams in phosphate plants. North Carolina phosphate ores have been found to contain a certain more or less fixed percentage of naturally occurring uranium daughter products (generally of $U_3O_8$) which can be used as an internal radioisotope tag for determining the $P_2O_5$ content by the above described gamma ray counting procedures.

Radiometric assay of phosphate ore flotation products indicates that the method can be used accurately for mill control on deslimed heads and floatation products from further steps in processing, but not on the slimes fraction from the initial ore separation nor consequently on the ore itself because too high a gamma ray count rate is produced. The cause of such spurious count is not known with certainty but is believed to be a result of the uranium being present in the ore in two forms, one associated with the phosphate and the other perhaps as a secondary mineral occurring interstitially, or possibly absorbed on the clay matrix present in the ore. If the weight percentage of the slimes fraction remained constant throughout the ore deposit then radiometric analyses could be made on the raw phosphate ore itself, but in general this is an unlikely situation.

Close correlation of gamma ray determinations of $P_2O_5$ content with wet chemical determinations was achieved on the other deslimed flotation products indicating utility of the present invention for phosphate processing with the aforementioned reservation.

Figure 3:
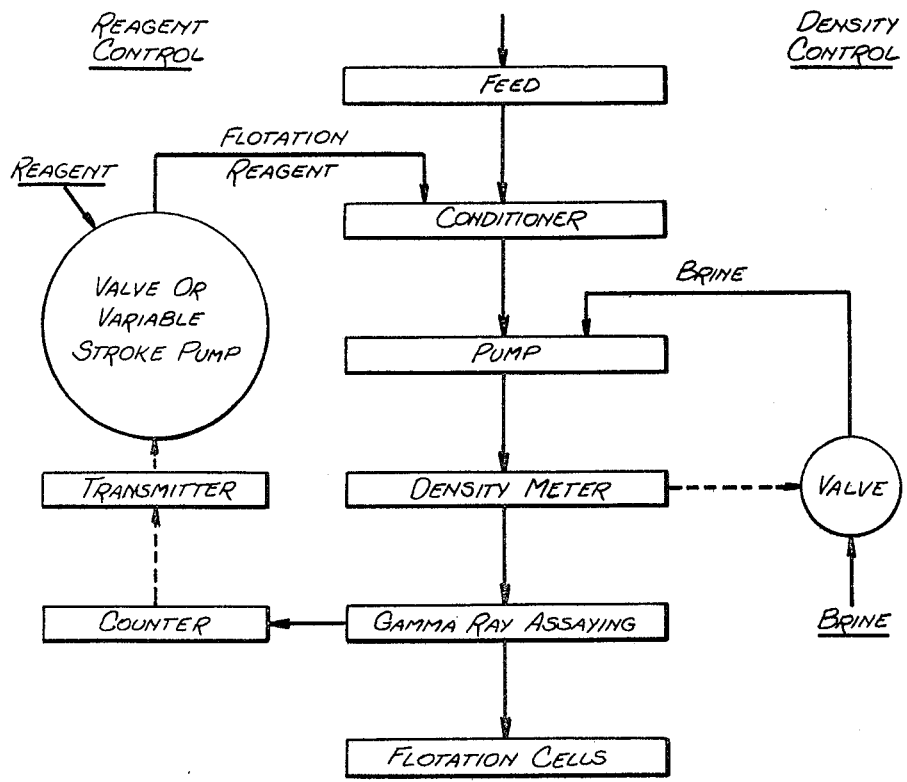
FIG. 3 is a block diagram of a system for automating reagent control in relation to potassium content of the ore in a flotation process.

Other specific control applications of the present invention are shown by way of example in FIGS. 3 and 4. FIG. 3 shows an arrangement by which the addition of flotation reagent to the ore feed coming into flotation cells is controlled by determining the ore content by its gamma radiation density and then through a counter and transmitter operating a valve or variable stroke pump in the reagent feed line. FIG. 4 shows a similar system for controlling the addition of leaching solution to ore slimes in flotation middlings for an agitation leaching treatment.

While certain embodiments of the invention have been shown and described herein, it is to be understood that changes and additions may be made by those skilled in the art without departing from the scope and spirit of the invention.

We claim:

1. A method of controlling a plant stream in a potash recovery process in which plant stream the potash includes a fixed percentage of naturally occurring gamma emitting $K^{40}$ based on the total potassium present, said method comprising the steps of making up a plurality of samples having known concentrations of total potassium corresponding to the concentration range preselected for said plant stream, determining the total potassium in said samples by chemical means, obtaining by radiometric means the gamma ray count per unit time for $K^{40}$ in said samples, correlating the chemical and radiometric data so obtained, thereafter controlling said plant stream for a preselected value of said total per unit time by making continuous determinations directly on said plant stream of the concentration of gamma emitting $K^{40}$ therein per unit time by radiometric means and maintaining the concentration of said gamma emitting $K^{40}$ in said plant stream at the correlated value corresponding to said preselected value of total potassium.

2. A method of controlling a plant stream in a phosphate recovery process in which plant stream the phosphate includes a fixed percentage of naturally occurring gamma emitting uranium material based on the total phosphate present, said method comprising the steps of making up a plurality of samples having known concentrations of total phosphate corresponding to the concentration range preselected for said plant stream, determining the total phosphate in said samples by chemical means, obtaining by radiometric means the gamma ray count per unit time for said uranium material in said samples, correlating the chemical and radiometric data so obtained, thereafter controlling said plant stream for a preselected value of said total phosphate per unit time by making continuous determinations directly on said plant stream of the concentration of gamma emitting uranium material therein per unit time by radiometric means and maintaining the concentration of said gamma emitting uranium material in said plant stream at the correlated value corresponding to said preselected value of total phosphate.

3. A method of controlling a plant stream in a potash recovery process in which plant stream the potash includes a fixed percentage of naturally occurring gamma emitting $K^{40}$ based on the total potassium present, said method comprising the steps of making up a plurality of samples having known concentrations of total potassium corresponding to the concentration range preselected for said plant stream, determining the total potassium in said samples by chloroplatinate analysis, obtaining by radiometric means the 1.46 mev. gamma ray count per unit time in said samples, correlating the chemical and radiometric data so obtained, thereafter controlling said plant stream for a preselected value of said total potassium per unit time by making continuous determinations directly on said plant stream of the concentration of gamma emitting $K^{40}$ therein per unit time by radiometric means and maintaining the flow rate of said plant stream at the correlated value which will provide said preselected value of total potassium.

References Cited

UNITED STATES PATENTS

| | | | |
|---|---|---|---|
| 2,826,700 | 3/1958 | Hull | 250—43.5 |
| 2,942,741 | 6/1960 | Ausman | 250—43.5 |
| 2,943,045 | 6/1960 | Hull et al. | 250—43.5 |
| 2,945,127 | 7/1960 | Hanson | 250—71.5 |

OTHER REFERENCES

Eckman, D. P.: Automatic Process Control, John Wiley and Sons, Inc., New York (1958) pages 210 and 254.

Faissner, H., et al.: "New Scintillation Liquids," Nucleonics, vol. 21, No. 2, February 1963, pages 50–52, 54 and 55.

The Harshaw Chemical Company, Cleveland, Ohio, Product Catalog, "Harshaw Scintillation Phosphors" (1958), page 18.

MORRIS O. WOLK, *Primary Examiner.*

H. A. BIRENBAUM, R. M. REESE,
*Assistant Examiners.*